United States Patent [19]

Riley

[11] Patent Number: 4,988,464

[45] Date of Patent: Jan. 29, 1991

[54] METHOD FOR PRODUCING POWDER BY GAS ATOMIZATION

[75] Inventor: Michael F. Riley, Danbury, Conn.

[73] Assignee: Union Carbide Corporation, Danbury, Conn.

[21] Appl. No.: 359,978

[22] Filed: Jun. 1, 1989

[51] Int. Cl.⁵ .............................................. B29B 9/10
[52] U.S. Cl. ........................................ 264/12; 75/338; 75/339; 425/7
[58] Field of Search .................... 264/12, 11; 425/7, 6; 75/338, 339, 337; 65/21.2

[56] References Cited

U.S. PATENT DOCUMENTS

| | | | |
|---|---|---|---|
| 1,501,449 | 7/1924 | Hall | 75/333 |
| 1,856,679 | 5/1932 | Williams et al. | 425/7 |
| 3,253,783 | 5/1966 | Probst et al. | 239/82 |
| 3,309,733 | 3/1967 | Winstrom | 425/7 |
| 3,340,334 | 9/1967 | Feldmann et al. | 264/12 |
| 3,501,802 | 3/1970 | Ullman et al. | 425/7 |
| 3,692,443 | 9/1972 | Lightner | 425/7 |
| 3,695,795 | 10/1972 | Jossick | 425/7 |
| 3,752,611 | 8/1973 | Reed et al. | 425/7 |
| 3,813,196 | 5/1974 | Backstrom et al. | 425/7 |
| 3,814,558 | 6/1974 | Ayers | 425/7 |
| 3,826,598 | 7/1974 | Kaufmann | 425/7 |
| 4,221,554 | 9/1980 | Oguchi et al. | 425/7 |
| 4,374,663 | 2/1983 | Hart | 425/7 |
| 4,416,600 | 11/1983 | Lecznar | 425/7 |
| 4,631,013 | 12/1986 | Miller | 425/7 |
| 4,778,516 | 10/1988 | Raman | 425/7 X |
| 4,787,935 | 11/1988 | Eylon et al. | 425/7 X |

OTHER PUBLICATIONS

Unal, Material Science Technology, vol. 3, pp. 1029–1039, 1987.
Gretzinger and Marshall, Aiche Journal, vol. 7, No. 2, pp. 312–318, 1961.

Primary Examiner—Mary Lynn Fertig
Attorney, Agent, or Firm—Stanley Ktorides

[57] ABSTRACT

A method for producing power by atomizing a stream of molten material by contact with a swirling annular gas stream having an angular to axial velocity ratio sufficient to cause some of the gas to flow in the axially opposite direction from that of the gas stream.

18 Claims, 3 Drawing Sheets

METHOD FOR PRODUCING POWDER BY GAS ATOMIZATION

TECHNICAL FIELD

This invention relates generally to the field of atomizing a molten stream, such as a molten metal stream, to produce droplets which solidify into powder and, more particularly, to processes where the atomization is carried out by contacting the molten stream with gas.

BACKGROUND ART

One method for the production of powder, such as metal powder, comprises the injection of a spiralling annular gas stream around a molten stream. The molten stream contacts the spiralling annular gas stream and particles are sheared from the molten stream, forming droplets which solidify into powder.

This known method has produced satisfactory results. However, it is desirable to produce powder having a more uniform size distribution than is possible with this known method, since such a more uniform size distribution will enable one to increase the yield and thus the efficiency of the powder production process.

Accordingly it is an object of this invention to provide a method for producing powder by gas atomization of a molten stream wherein powder is produced having a more uniform size distribution than that achievable with heretofore known methods.

SUMMARY OF THE INVENTION

The above and other objects which will become apparent to one skilled in the art upon a reading of this disclosure are attained by:

A method for producing powder comprising:
(A) forming an axially flowing stream of molten material;
(B) forming a diverging swirling annular stream of gas around and along the molten stream, said gas stream having an angular velocity to axial velocity ratio sufficient to cause some of the gas to flow toward the molten stream in the axially opposite direction from that of the diverging annular gas stream;
(C) contacting the molten stream with the oppositely flowing gas stream thereby causing rapid radial spreading of the molten stream;
(D) contacting the radially spreading molten stream with the diverging swirling annular gas stream causing the molten stream to form droplets; and
(E) solidifying the droplets to form powder.

DETAILED DESCRIPTION

In the method of this invention, molten material is caused to form an axially flowing stream through, for example, air, such as by injecting the molten material under sufficient pressure through an injection nozzle. Generally the molten material is metal such as iron, steel, copper, nickel, aluminum, magnesium and their alloys. The method of this invention may also be used to produce non-metallic powders such as by employing oxides or ceramic materials as the molten stream.

The powders produced by the method of this invention may be used in a great many applications such as being consolidated into parts for such products as automobiles, farm equipment, aircraft engines, appliances and business equipment, being consolidated into cutting or machining tools, and being thermally sprayed onto other materials as protective or wear resistant coatings.

Around and along the axially flowing molten stream there is formed an annular stream of atomizing gas. The atomizing gas is generally an inert or substantially inert gas such as argon, helium or nitrogen. However, any suitable gas or gas mixture may be employed with the method of this invention. For example an oxidizing gas such as air or an inert/oxygen mixture may be used to atomize reactive metals such as magnesium or aluminum to produce an oxide layer rendering the resulting metal powders less explosive.

The atomizing gas may be injected through any suitable device which will form an annular stream around the molten stream. One such device is an annular nozzle around the molten stream injection nozzle. Another such device is a nozzle having a plurality of gas injection ports around the molten stream injection nozzle.

The atomizing gas is injected under pressure, generally within the range of from 50 to 2500 pounds per square inch absolute (psia), and having an angular injection component, causing the annular gas stream to swirl circumferentially around the molten stream, and to diverge in an outwardly forming cone from the injection point.

The method of this invention comprises the reverse flow of a component of the atomizing gas back toward the molten material injection point. That is, while the majority of the diverging swirling annular gas stream continues to flow axially outward in an expanding cone from the injection point, some of the gas flows in the axially opposite direction back toward the injection point.

The reverse flow of the method of this invention is achieved by creating a region of negative gauge pressure close to the gas injection point. This negative gauge pressure is created by viscous friction between the annular gas stream and the ambient atmosphere immediately surrounding the stream. This viscous friction entrains some of the immediately surrounding ambient atmosphere thereby reducing the local pressure in the immediately surrounding region.

Figure 1:
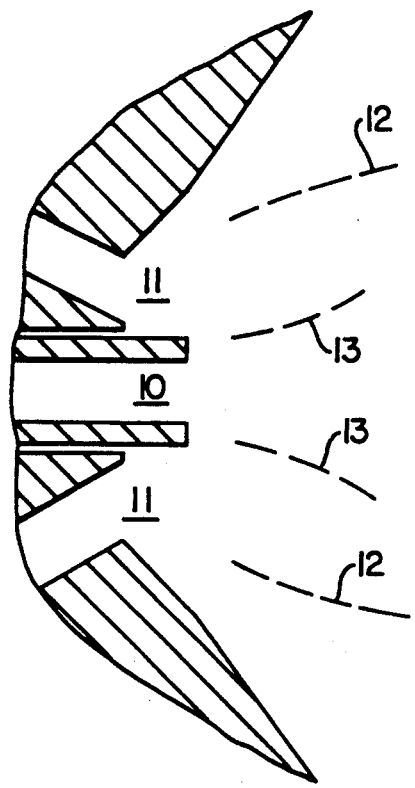
FIG. 1 is a cross-sectional representation of the annular gas stream of the method of this invention showing the diverging inner gas jet boundary.
Figure 2:
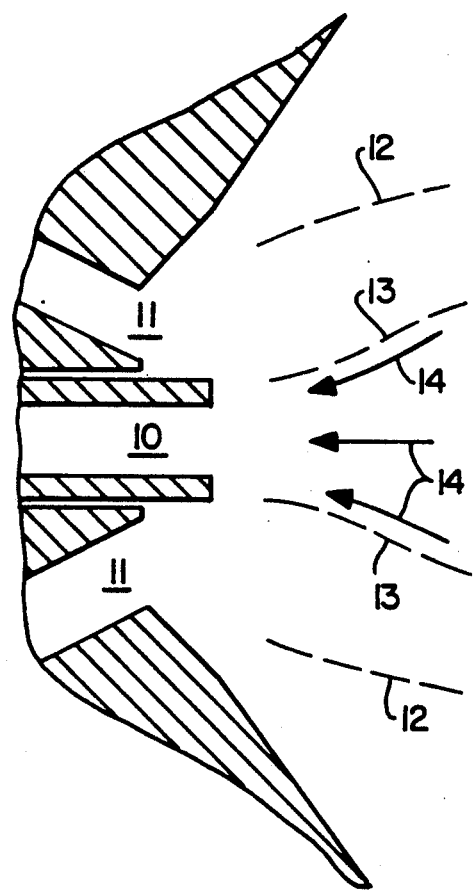
FIG. 2 is a cross-sectional representation of the molten and annular gas stream of the method of this invention showing the oppositely flowing gas component.

In the method of this invention the reverse flow is achieved while at the same time providing sufficient angular velocity to the swirling gas stream to cause the inner boundary of the conical annular gas stream to diverge rather than converge as is conventionally the case. In FIG. 1 there is shown a cross-sectional representation of this diverging inner boundary. Referring to FIG. 1, while molten material is injected through nozzle 10, gas is injected around and along the resulting molten stream through nozzle 11. The gas stream forms an outwardly expanding cone defined by outer boundary 12. However the inner boundary 13 of this gas cone also diverges This is in contrast to conventional methods wherein the inner boundary converges against the molten stream. This divergence increases the area of contact between the annular gas stream and the ambient atmosphere within the annular gas stream. This increased area of contact results in a more rapid entrainment of the ambient atmosphere within the annular gas stream and creates a larger reverse gas flowrate. This reverse flow is shown in the cross-sectional representation of FIG. 2. The numerals of FIG. 2 correspond to those of FIG. 1 for the common elements. Referring to FIG. 2, a portion of the gas injected through nozzle 11 in the outwardly expanding cone defined by boundaries 12 and 13 reverses its flow direction and flows toward nozzle 10, as shown by arrows 14, in a direction axially opposite to that of the diverging annular gas stream The requisite divergence may be attained by injecting the gas so that the annular stream that is formed has an angular velocity to axial velocity ratio of at least about 0.6, preferably at least 0.65, especially when the gas flow rate is low compared to the inner diameter of the annular gas stream measured at the nozzle, such as below 200 standard cubic feet per minute (scfm) with an annular inner diameter of 6 millimeters (mm). The annular gas stream preferably has a mass flowrate within the range of from 0.1 to 10 times molten stream mass flowrate. For the pressures generally used to inject the atomizing gas as described above, the gas exits the nozzle at sonic velocity.

The divergence attained in the annular stream is substantially the same even when the angular velocity to axial velocity ratio exceeds 0.6. However, at the lower end of the pressure range generally employed for the atomizing gas, the flow pattern abruptly changes at angular velocity to axial velocity ratios of about 2. At ratios of about 2, the annular stream flows radially outward perpendicular to the molten stream, resulting in poor contact between the gas stream and the molten stream.

Figure 3:
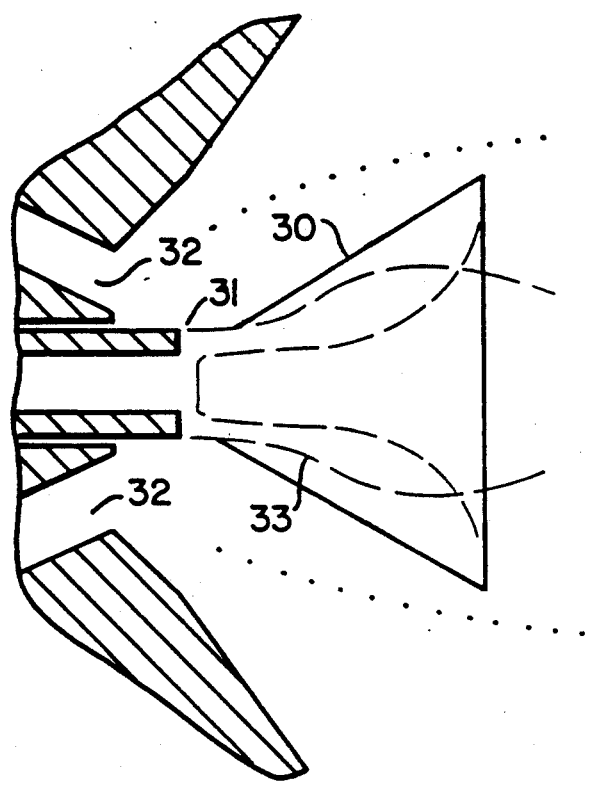
FIG. 3 is a cross-sectional representation of the effect on the molten stream of the method of this invention.

In the method of this invention, the oppositely flowing gas contacts the molten stream in the direction opposite to that which the molten stream is flowing. The larger flowrate of the oppositely flowing gas achieved by the method of this invention contacts the molten stream and causes the molten stream to rapidly spread radially outward. FIG. 3 depicts the typical shape of the molten stream just downstream of the injection point during the operation of the method of this invention. In FIG. 3 there is shown frozen accretion 30 which formed on the molten stream injection nozzle at the completion of the operation of the method of this invention wherein the molten material was copper and the atomizing gas was nitrogen which was injected from nozzle 32 at a pressure of 100 pounds per square inch gauge (psig) and at a flowrate of 250 standard cubic feet per minute (scfm). The annular gas stream had an angular velocity of 580 feet per second (fps) and an axial velocity of 810 fps resulting in an angular to axial velocity ratio of 0.65.

Figure 4:
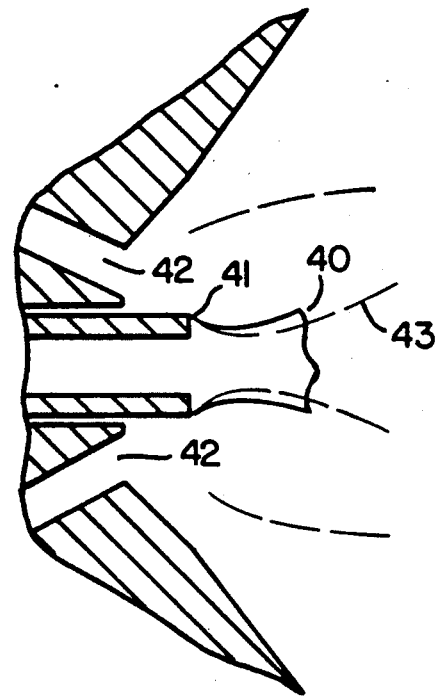
FIG. 4 is a cross-sectional representation of the effect on the molten stream when the method of this invention is not employed.

In contrast and for comparative purposes the frozen accretion 40 formed when the method of this invention was not employed is shown in FIG. 4. In the FIG. 4 case, the molten material was copper injected through nozzle 41 and the atomizing gas was nitrogen injected at 100 psig and 150 scfm through nozzle 42. Nozzles 31 and 41 and nozzles 32 and 42 were substantially similar. The annular gas stream had an angular velocity of 380 fps and an axial velocity of 985 fps resulting in an angular to axial velocity ratio of only 0.39.

It is seen that when the method of this invention is not employed, as depicted in FIG. 4, the inner gas boundary constricts. The converging wake and the lower flowrate of oppositely flowing gas cause the metal stream to follow the gas inner boundary 43 while not significantly penetrating into the gas stream. In contrast, when the method of this invention is employed, as depicted in FIG. 3, the diverging inner boundary 33 combines with the larger reverse flow to force the molten stream radially outward and into the gas stream.

The radially spreading molten stream contacts the diverging swirling annular gas stream causing the formation of droplets which are subsequently solidified. The resulting powder is then recovered by conventional techniques well known to those skilled in this art.

The radially outward spreading of the molten material stream into the gas stream, as depicted in FIG. 3, results in a more uniform particle size. While not wishing to be held to any theory, applicant believes that the primary reason for this improvement is that with the method of this invention, the molten stream is exposed to the interior of the gas stream where flow conditions are more consistent and more uniform than are conditions at the stream boundary. A secondary reason for the improvement may be that the diverging gas stream and strong reverse gas flow reduce the frequency of collisions between, and coalescence of, smaller atomized droplets into large droplets.

The following examples and comparative examples are presented to further illustrate the invention and the advantages attainable thereby. They are not intended to be limiting.

A series of 6 atomization runs were carried out in accord with the method of this invention. The molten material was grade CDA102 (oxygen free high conductivity) copper and the atomizing gas was nitrogen. The powder formed was analyzed with respect to particle size. The data for each run 1-6 is summarized in Table 1.

TABLE 1

| Run No. | Pressure (psig) | Gas Flowrate (scfm) | Gas/Metal Flowrate Ratio | Angular/ Axial Velocity Ratio | Standard Deviation |
|---|---|---|---|---|---|
| 1 | 55 | 150 | 0.66 | 0.65 | 2.2 |
| 2 | 100 | 150 | 0.61 | 0.79 | 2.0 |
| 3 | 100 | 250 | 0.92 | 0.65 | 1.9 |
| 4 | 100 | 250 | 0.90 | 0.65 | 1.8 |
| 5 | 100 | 250 | 0.90 | 0.65 | 1.8 |
| 6 | 800 | 250 | 0.89 | 0.87 | 1.9 |

Figure 5:
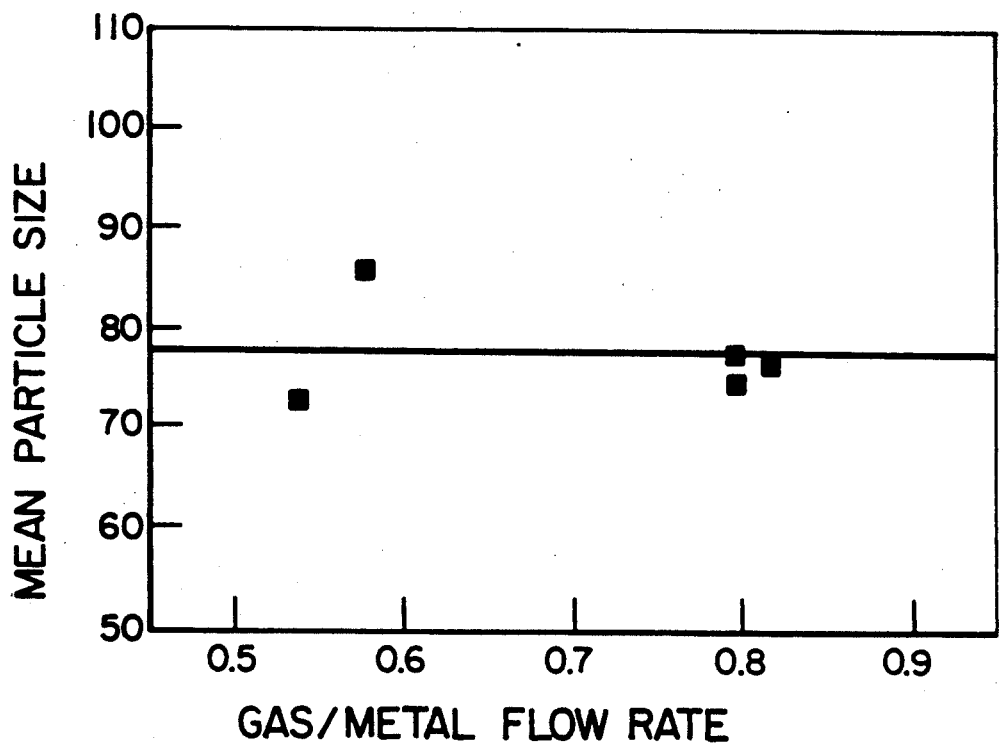
FIG. 5 is a graphical representation of the powder mean particle size as a function of the as to molten material flowrate ratio achieved with the method of this invention.

The average standard deviation at 150 scfm was 2.1 and at 250 scfm was 1.85. A graphical representation of the mean particle size to the nitrogen to copper flowrate ratio for nitrogen at a pressure in the range of from 55 to 100 psig is illustrated in FIG. 5. As shown in FIG. 5, the mean particle size of powder produced by the method of this invention is independent of the gas to molten material flowrate.

For comparative purposes the procedure was repeated except that the angular to axial velocity ratio of the nitrogen was less than that necessary to cause the reverse flow of the method of this invention. The data for these comparative runs 7–12 is summarized in Table 2.

TABLE 2

| Run No. | Pressure (psig) | Gas Flowrate (scfm) | Gas/Metal Flowrate Ratio | Angular/ Axial Velocity Ratio | Standard Deviation |
|---|---|---|---|---|---|
| 7 | 55 | 150 | 0.53 | 0.39 | 2.4 |
| 8 | 100 | 150 | 0.56 | 0.39 | 2.1 |
| 9 | 100 | 150 | 0.58 | 0.62 | 2.2 |
| 10 | 100 | 150 | 0.99 | 0.39 | 2.1 |
| 11 | 100 | 250 | 0.80 | 0.39 | 2.0 |
| 12 | 800 | 250 | 1.09 | 0.38 | 2.1 |

The average standard deviation at 150 scfm was 2.25 and at 250 scfm was 2.05.

Considering the 250 scfm case and assuming a mean particle size of 75 micrometers, a powder having a particle size standard deviation of 1.85 will have a 43 percent yield of powders between 53 and 106 micrometers, that is between No. 270 and No. 140 standard sieve sizes. A powder having a particle size standard deviation of 2.05 will have only a 37 percent yield within the same size range. Thus the method of this invention enables the attainment, in this reported example, of a 16 percent improvement in yield.

Figure 6:
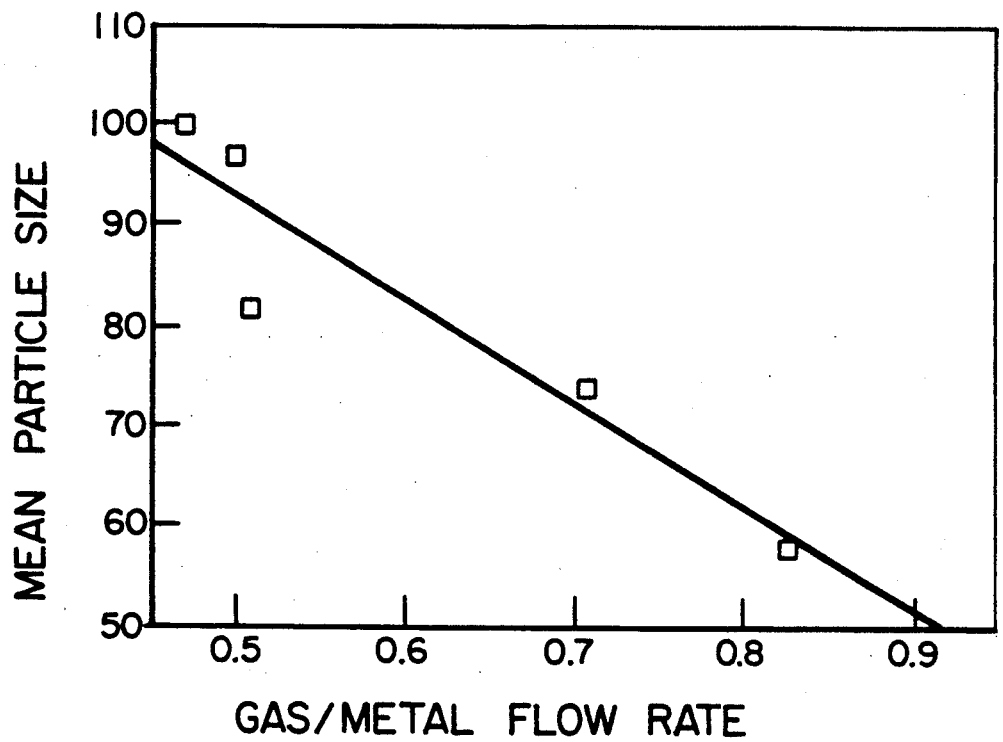
FIG. 6 is a graphical representation of the powder mean particle size as a function of the gas to molten material flowrate ratio achieved when the method of this invention is not employed.

Moreover, a graphical representation of the mean particle size to the nitrogen to copper flowrate ratio for the comparative examples is illustrated in FIG. 6. As shown in FIG. 6, the mean particle size of the powder varies with the gas to molten material flowrate ratio. This variation shown in FIG. 6 can lead to further increases in the standard deviation of the powder produced and thereby to further losses in yield. In contrast to the effect shown on FIG. 6, the mean powder sizes produced by the method of this invention are independent of the gas to molten material flowrate ratio, as shown in FIG. 5. This independence of mean size from the flowrate ratio assures that the desired mean size will be produced in spite of inherent or accidental variations in the atomizing gas to molten material flowrate ratio due, for example, to variation in, blockage of or erosion of the inner diameter of the molten material injection nozzle, to damage to the gas injection nozzle, or to variations in the gas or molten material temperatures.

Generally the powder produced by use of the method of this invention will have a particle size within the range of from 1 to 1000 micrometers.

Now by the use of the method of this invention, one can carry out powder production by gas atomization with significantly improved particle size distribution, and thus improved yield and process efficiency, over that attainable with conventional methods.

Although the invention has been described in detail with reference to certain embodiments, those skilled in the art will recognize that there are other embodiments of the invention within the scope and spirit of the claims.

I claim:
1. A method for producing powder comprising:
   (A) a forming an axially flowing stream of molten material;
   (B) forming a diverging swirling annular stream of gas around and along the molten stream, said gas stream having an angular velocity to axial velocity ratio sufficient to cause some of the gas to flow toward the molten stream in the axially opposite direction from that of the diverging annular gas stream;
   (C) contacting the molten stream with the oppositely flowing gas stream thereby causing rapid radial spreading of the molten stream;
   (D) contacting the radially spreading molten stream with the diverging annular gas stream causing the molten stream to form droplets; and
   (E) solidifying the droplets to form powder.
2. The method of claim 1 wherein the angular velocity to axial velocity ratio is at least about 0.6.
3. The method of claim 1 wherein the angular velocity to axial ratio does not exceed about 2.
4. The method of claim 1 wherein the annular gas stream has a mass flowrate within the range of from 0.1 to 10 times the molten stream mass flowrate.
5. The method of claim 1 wherein the powder has a mean particle size within the range of from 1 to 1000 micrometers.
6. The method of claim 1 wherein the molten material is metal.
7. The method of claim 6 wherein the metal is copper.
8. The method of claim 1 wherein the molten material is ceramic.
9. The method of claim 1 wherein the gas comprises nitrogen.
10. The method of claim 1 wherein the gas comprises helium.
11. The method of claim 1 wherein the gas comprises argon.
12. The method of claim 1 wherein the gas comprises an oxidizing gas.
13. The method of claim 12 wherein at least some of the molten material is oxidized as a result of the contact between the molten material and the gas.
14. The method of claim 1 wherein the gas is a gas mixture.
15. The method of claim 14 wherein the gas mixture comprises two or more of the gases from the group consisting of nitrogen, argon, helium and oxygen.
16. The method of claim 1 wherein the angular velocity to axial velocity ratio is at least 0.65.
17. The method of claim 1 wherein the annular gas stream is formed by the injection of gas through an annular nozzle.
18. The method of claim 1 wherein the annular gas stream is formed by the injection of gas through a plurality of gas injection ports.

* * * * *